(12) United States Patent
Ishino et al.

(10) Patent No.: US 11,904,777 B2
(45) Date of Patent: Feb. 20, 2024

(54) WORK VEHICLE

(71) Applicant: Yanmar Holdings Co., Ltd., Osaka (JP)

(72) Inventors: Tatsuya Ishino, Okayama (JP); Yohei Nakagawa, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 17/903,426

(22) Filed: Sep. 6, 2022

(65) Prior Publication Data

US 2023/0076007 A1 Mar. 9, 2023

(30) Foreign Application Priority Data

Sep. 6, 2021 (JP) ................................. 2021-144798

(51) Int. Cl.
| | | |
|---|---|---|
| *B60R 11/00* | (2006.01) | |
| *A01B 76/00* | (2006.01) | |
| *B62D 49/06* | (2006.01) | |
| *H01Q 1/32* | (2006.01) | |
| *B60R 21/13* | (2006.01) | |

(52) U.S. Cl.
CPC .............. *B60R 11/00* (2013.01); *A01B 76/00* (2013.01); *B62D 49/06* (2013.01); *H01Q 1/325* (2013.01); *H01Q 1/3208* (2013.01); *B60R 21/131* (2013.01); *B60R 2011/004* (2013.01); *B60R 2011/0052* (2013.01); *B60R 2011/0066* (2013.01)

(58) Field of Classification Search
CPC . B60R 11/00; B60R 21/31; B60R 2011/0066; B62D 49/06; A01B 76/00; H01Q 1/325
See application file for complete search history.

(56) References Cited

U.S. PATENT DOCUMENTS

| | | | |
|---|---|---|---|
| 11,529,920 B2 * | 12/2022 | Misaki | ................ B60R 21/131 |
| 11,760,293 B2 * | 9/2023 | Kobayashi | ............... B62D 1/04 |
| | | | 180/400 |
| 2023/0076382 A1 * | 3/2023 | Ishino | ..................... B60R 11/00 |
| 2023/0077096 A1 * | 3/2023 | Ishino | ................... G05D 1/0011 |

FOREIGN PATENT DOCUMENTS

JP 2019-108003 A 7/2019

* cited by examiner

*Primary Examiner* — Faye M Fleming
(74) *Attorney, Agent, or Firm* — NORTON ROSE FULBRIGHT US LLP

(57) ABSTRACT

A work vehicle includes a vehicle body to which work instrument is connected at a back, and a ROPS frame erected at a back portion of a driver seat area in the vehicle body. The work vehicle further includes a positioning unit configured to detect a position of the vehicle body based on a signal sent from a positioning satellite, and a support unit that is fixed to an upper portion of the ROPS frame and supports the positioning unit from below. The positioning unit has a harness connection portion that is connected to a harness for sending information to outside. The harness connection portion is located at a back portion of the positioning unit. The support unit is located protruding backwardly from the harness connection portion of the positioning unit.

7 Claims, 16 Drawing Sheets

WORK VEHICLE

CROSS-REFERENCE TO RELATED APPLICATIONS

This application is claims priority under 35 U.S.C. § 119 to JP Application No. 2021-144798 filed Sep. 6, 2021, the entire contents of which are hereby incorporated by reference.

TECHNICAL FIELD

The present invention relates to a work vehicle such as tractor.

BACKGROUND ART

Conventionally, there has been proposed a technology that installs a positioning unit that detects the position of a vehicle body in a roll-over protection structure (ROPS) frame of a tractor (see, for example, Patent Document 1). The ROPS frame is a guard provided around a driver seat area so as to protect the driver in the event of a fall in a tractor without a ceiling and pillars to support the ceiling, and is erected in an inverted U shape at the back of the driver seat area on the vehicle body, for example.

PRIOR ART DOCUMENT

Patent Document

Patent Document 1: Japanese Unexamined Patent Application Publication No. 2019-108003

SUMMARY OF INVENTION

Technical Problem

The information acquired by the positioning unit (e.g., position information of tractor) is sent to a controller via a harness. For example, if a connection portion with a harness (hereinafter referred to as "harness connection portion") is provided at the back portion of the positioning unit; when a work instrument connected to the back of the tractor body is raised while the positioning unit is fixed to the upper portion of the ROPS frame, there is a risk of the harness connection portion of the positioning unit coming into contact with the work instrument and being damaged.

The present invention has been made to solve the above problem; it is therefore an object of the present invention to provide a work vehicle that can reduce the risk of the harness connection portion of the positioning unit coming into contact with the work instrument and being damaged.

Solution to Problem

A work vehicle according to one aspect of the present invention includes: a vehicle body to which a work instrument is connected at a back; and a ROPS frame erected at a back portion of a driver seat area in the vehicle body, wherein the work vehicle further includes: a positioning unit that detects a position of the vehicle body based on a signal sent from a positioning satellite, and a support unit that is fixed to an upper portion of the ROPS frame and supports the positioning unit from below, wherein the positioning unit has a harness connection portion that is connected to a harness for sending information to outside, and wherein the harness connection portion is located at a back portion of the positioning unit, and wherein the support unit is located protruding backwardly from the harness connection portion of the positioning unit.

Advantageous Effects of Invention

The above configuration can reduce the risk the harness connection portion of the positioning unit coming into contact with the work instrument and being damaged.

DESCRIPTION OF EMBODIMENTS

Figure 1:
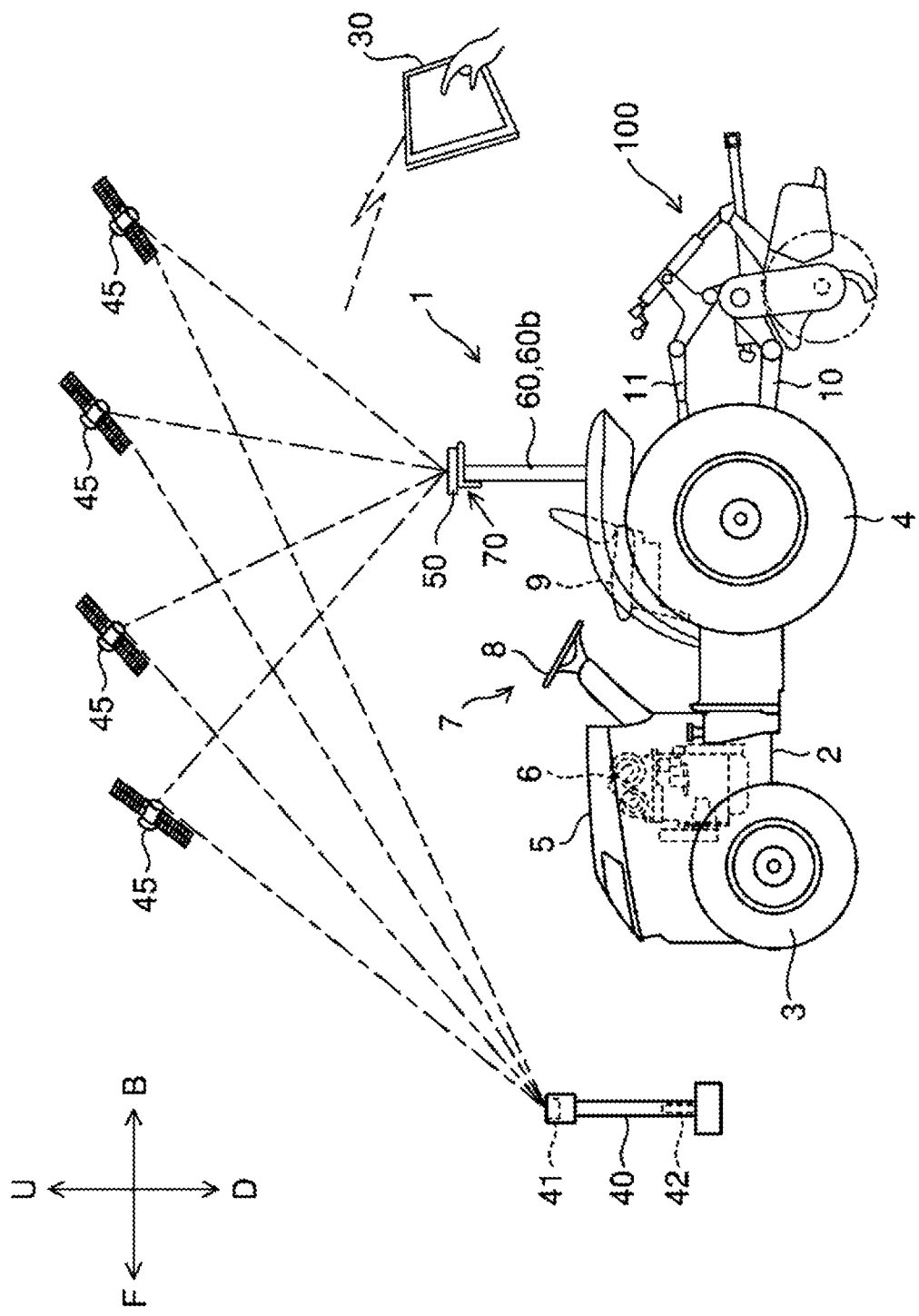
FIG. 1 is a schematic side view of a configuration of a tractor which is an example of a work vehicle according to an embodiment of the present invention.

The following is a description of an embodiment of the present invention based on the drawings. In the present embodiment, a tractor will be described as an example of a work vehicle. In addition to the tractor, examples of the work vehicle include riding work vehicles such as a rice transplanter, a combine harvester, a civil engineering and construction work device, and a snowplow.

In this description, directions are defined as follows. First, the direction in which the tractor as the work vehicle proceeds during work is defined as "front" and the opposite direction is defined as "back". The right side toward the proceeding direction of the tractor is defined as right, and the left side is defined as left. The direction perpendicular to the front-back and left-right directions of the tractor is defined as a vertical direction. In this case, the direction of gravity is downward and the opposite side is upward. In the drawings, the front direction is indicated by F, the back direction by B, the left direction by L, the right direction by R, the upward direction by U, and the downward direction by D.

[1. Overview of Vehicle Travel System]

Figure 2:
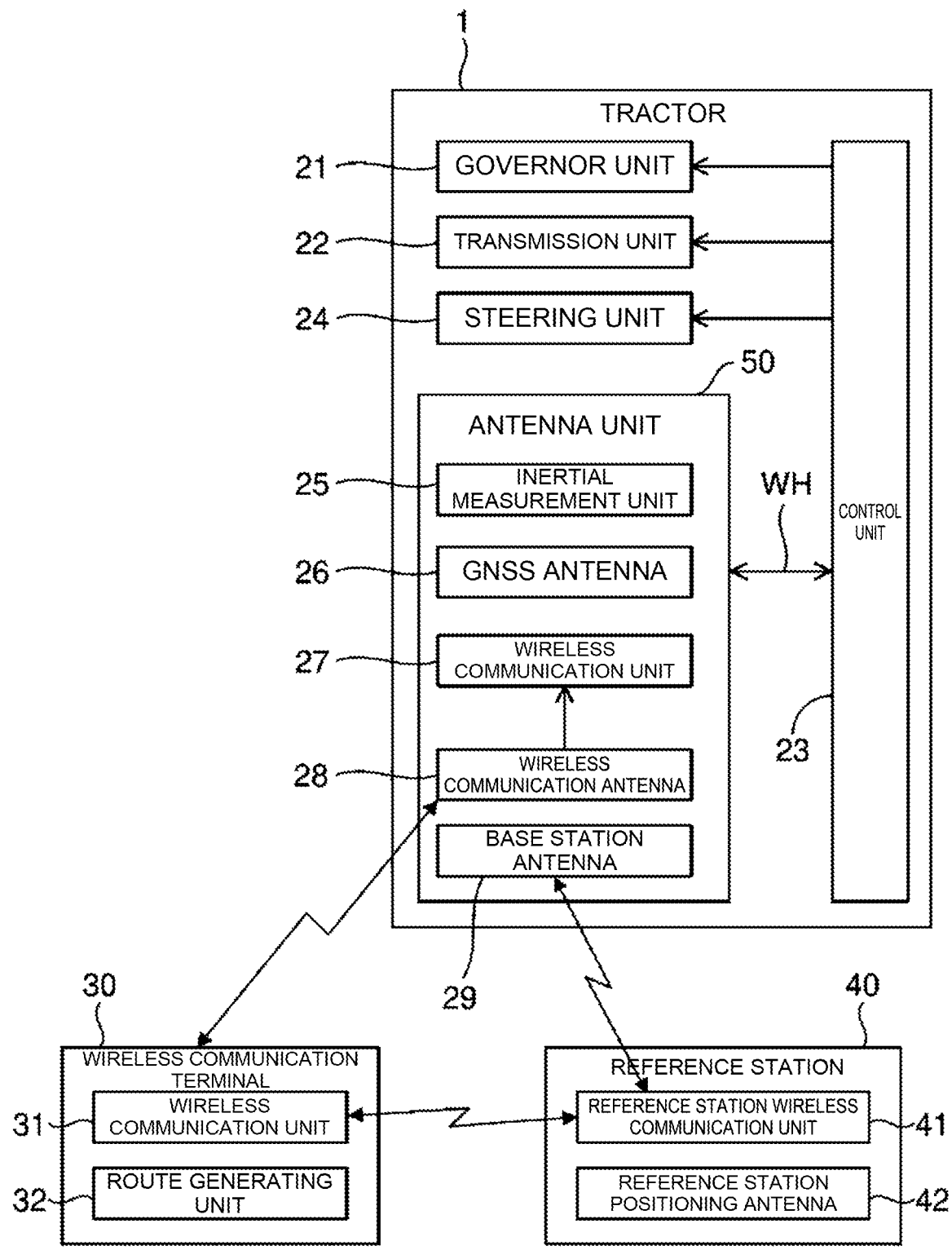
FIG. 2 is a block diagram of a vehicle travel system including the tractor.

FIG. 1 is a schematic side view of a tractor 1 which is an example of a work vehicle of the present embodiment. FIG. 2 is a block diagram of a vehicle travel system including the tractor 1.

As shown in FIG. 2, the vehicle travel system is composed of the tractor 1, a wireless communication terminal 30, and a reference station 40. The tractor 1 can travel according to the operation of the driver or can travel autonomously based on an instruction or the like from the wireless communication terminal 30. The wireless communication terminal 30 is a terminal for giving various instructions, etc. to the tractor 1. The reference station 40 is provided so as to obtain position information of the tractor 1.

As shown in FIG. 1, the tractor 1 includes a vehicle body 2. At the back of the vehicle body 2, a work instrument 100 can be mounted. That is, the tractor 1 is equipped with the vehicle body 2 to which work instrument 100 is connected at the back. The work instrument 100 can be, for example, but is not limited to, cultivators, plows, and fertilizer application equipment.

The front portion of the vehicle body 2 is supported by a pair of left-right front wheels 3. The back portion of the vehicle body 2 is supported by a pair of left-right back wheels 4. In the front portion of the vehicle body 2, a hood 5 is located. An engine 6 as a drive source is located below the hood 5. The engine 6 is composed of a diesel engine, for example, but is not limited to this and may be composed of a gasoline engine, for example. In addition to or instead of the engine 6, an electric motor may be used as the drive source.

In the upper center portion in the front-back direction in the vehicle body 2, a driver seat area 7 is provided for a man operator (driver). The driver seat area 7 is equipped with a steering wheel 8 for the driver to make a steering operation, and a driver seat 9 for the driver. Although not shown in the drawing, the driver seat area 7 is provided with control levers, pedals, etc. operated by the driver.

A three-point link mechanism is provided on the back side of the vehicle body 2. The three-point link mechanism is composed of a pair of left-right lower links 10 and an upper link 11. The work instrument 100 is configured to be mountable to the three-point link mechanism. A raising-lowering device (not shown) with a hydraulic system such as a lifting cylinder is provided at the back side of the vehicle body 2. The raising-lowering device raises and lowers the three-point link mechanism, thereby making it possible to raise and lower the work instrument 100.

In the vehicle body 2, a ROPS frame 60 is provided at the back portion of the driver seat area 7 (driver seat 9). The ROPS frame 60 is a safety frame (guard) provided for the purpose of protecting the man operator in the event that the tractor 1 tips over, as described above. The ROPS frame 60 is composed of a hollow frame, and is erected in an inverted U-shape at the back portion of the driver seat area 7. That is, the tractor 1 is equipped with the ROPS frame 60 that is erected at the back portion of the driver seat area 7 in the vehicle body 2. The height of the ROPS frame 60 can be set as needed within the range specified by the regulations.

The ROPS frame 60 is so configured that two longitudinal frames 60b extending in the vertical direction are each connected to one end of the transverse frame 60a (see FIG. 3, etc.) extending in the left-right direction. The coupling portion between the transverse frame 60a and the longitudinal frame 60b is rounded (curvature). This results in the inverted U-shaped ROPS frame 60 described above.

As shown in FIG. 2, tractor 1 is provided with a governor unit 21 that can adjust the rotational speed of engine 6 and a transmission unit 22 that changes the speed and transmits the rotational drive power from the engine 6 to the drive wheels. The governor unit 21 and transmission unit 22 are controlled by a control unit 23.

The tractor 1 is equipped with a steering unit 24. The steering unit 24 is provided, for example, at the midpoint of the rotational axis of the steering wheel 8 and is configured to adjust the rotational angle (steering angle) of the steering wheel 8. By the control unit 23 controlling the steering unit 24, the tractor 1 can not only drive straight ahead, but also turn the steering wheel 8 at a desired angle, and can make a turn at a desired turning radius.

The tractor 1 is further equipped with an antenna unit 50. The antenna unit 50 is a positioning unit that detects the position of vehicle body 2 based on a signal sent from a positioning satellite (navigation satellite) 45 shown in FIG. 1.

The antenna unit 50 and the control unit 23 are electrically connected by a harness WH. This can send various information or instructions between the antenna unit 50 and the control unit 23 via the harness WH. For example, the vehicle body 2's position information detected by the antenna unit 50 is input to the control unit 23 via the harness WH.

Details of the antenna unit 50 are described below. The antenna unit 50 has an inertial measurement unit (IMU) 25, a GNSS (Global Navigation Satellite System) antenna 26, a wireless communication unit 27, a wireless communication antenna 28, and a base station antenna 29.

The inertial measurement unit 25 is equipped with a 3-axis gyro sensor and a 3-way accelerometer, which detects angular velocity and acceleration in three dimensions. The detected value of the inertial measurement unit 25 is input to the control unit 23. The control unit 23 can obtain the attitude information of the tractor 1 based on the above detected value. The above attitude information includes, for example, the azimuth angle of a machine body (yaw angle), the left-right tilt angle of the machine body (roll angle), and the front-back tilt angle in the direction where the machine body is proceeding (pitch angle).

The GNSS antenna 26 receives radio signals sent from a positioning satellite 45 that forms a satellite positioning system (GNSS). In the satellite positioning system, in addition to GPS (Global Positioning System; U.S.), Quasi-Zenith Satellite System (Japan), GLONASS satellite (Russia) or the like can be used as positioning satellites.

The wireless communication unit 27 sends and receives various signals via a wireless communication network formed in combination with the wireless communication terminal 30 and other devices. In the present embodiment, the wireless communication unit 27 is a Wifi (registered trademark) unit with a frequency band of 2.4 GHz. Signals sent from the wireless communication terminal 30 are received by the wireless communication antenna 28 and, and are input to the control unit 23 via the wireless communication unit 27. In addition, signals from the control unit 23 are sent via the wireless communication unit 27 and the wireless communication antenna 28 to a wireless communication unit 31, etc. of the wireless communication terminal 30.

Here, for example, RTK (Real Time Kinematic) positioning is used in the present embodiment, as a positioning method using the satellite positioning system. In the RTK positioning, the carrier phase (satellite positioning information) from the positioning satellites 45 is measured by both of a reference station positioning antenna 42 of the reference station 40 installed at the reference point, and the GNSS antenna 26 of the tractor 1 that is on the mobile station side of the target for which the position information is sought. At the reference station 40, correction information is generated each time the satellite positioning information is measured from the positioning satellite 45, or each time a set period elapses. The above correction information is sent from a reference station radio communication unit 41 to the base station antenna 29 of the tractor 1. Using the correction information sent from the reference station 40, the control unit 23 of the tractor 1 corrects the satellite positioning information measured by the GNSS antenna 26, thereby to seek the current position information of the tractor 1. The control unit 23 seeks, for example, latitude information and longitude information as the current position information of the tractor 1.

The positioning method used is not limited to the RTK positioning described above, and other positioning methods such as DGPS (differential GPS positioning) may also be used. Further, the reference station 40 can send and receive various information not only to and from the tractor 1, but also to and from the wireless communication terminal 30.

The wireless communication terminal 30 is composed of, for example, a tablet type personal computer having a touch screen, and the like. The wireless communication terminal 30 is provided with a wireless communication unit 31 and a route generating unit 32 that generates a target travel route. Based on various information input at the touch screen, the route generating unit 32 can generate the target travel route for autonomous driving of the tractor 1. The route generating unit 32 is composed of a CPU (Central Processing Unit), for example, owned by the personal computer.

The wireless communication terminal 30 sends various information to the tractor 1 for autonomous driving of the tractor 1, such as the target travel route. The control unit 23 of the tractor 1 controls the transmission unit 22, the steering unit 24, etc., based on the tractor 1's current position information required from receiving signals, etc., of the GNSS antenna 26 and on the vehicle body 2's attitude information (displacement information, orientation information) required from the detected value at the inertial measurement unit 25. This allows the tractor 1 to travel autonomously along the target travel route generated by the route generating unit 32.

[2. Support Unit]

As shown in FIG. 1, the tractor 1 is further equipped with a support unit 70. The support unit 70 is fixed to the upper portion of the ROPS frame 60, and supports the antenna unit 50 from below. The antenna unit 50 is thus fixed to the upper portion of the ROPS frame 60 via the support unit 70.

In the present embodiment, from the viewpoint of reducing the effect of the tractor 1's vibration on the position detection accuracy of the antenna unit 50, the antenna unit 50 is supported by the support unit 70 so that the gravitational center of the antenna unit 50 is located in the ROPS frame 60's center in the front-back direction. Details of the configuration of the support unit 70 are described below.

Figure 3:
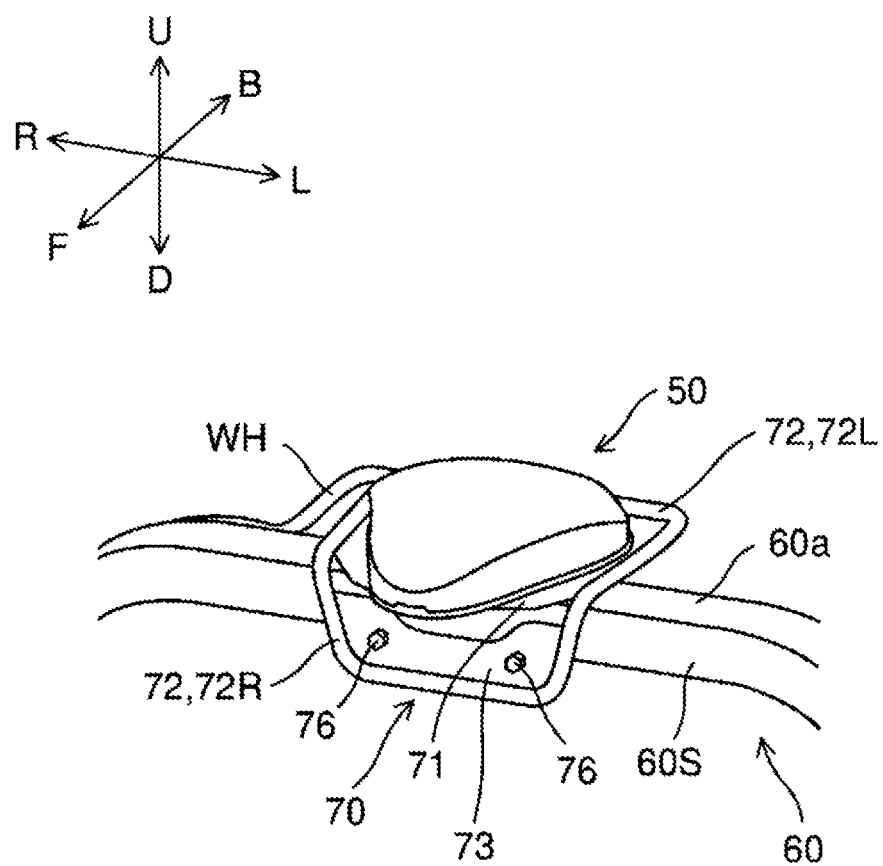
FIG. 3 is a perspective view of an antenna unit and support unit mounted on the tractor seen from above.
Figure 4:
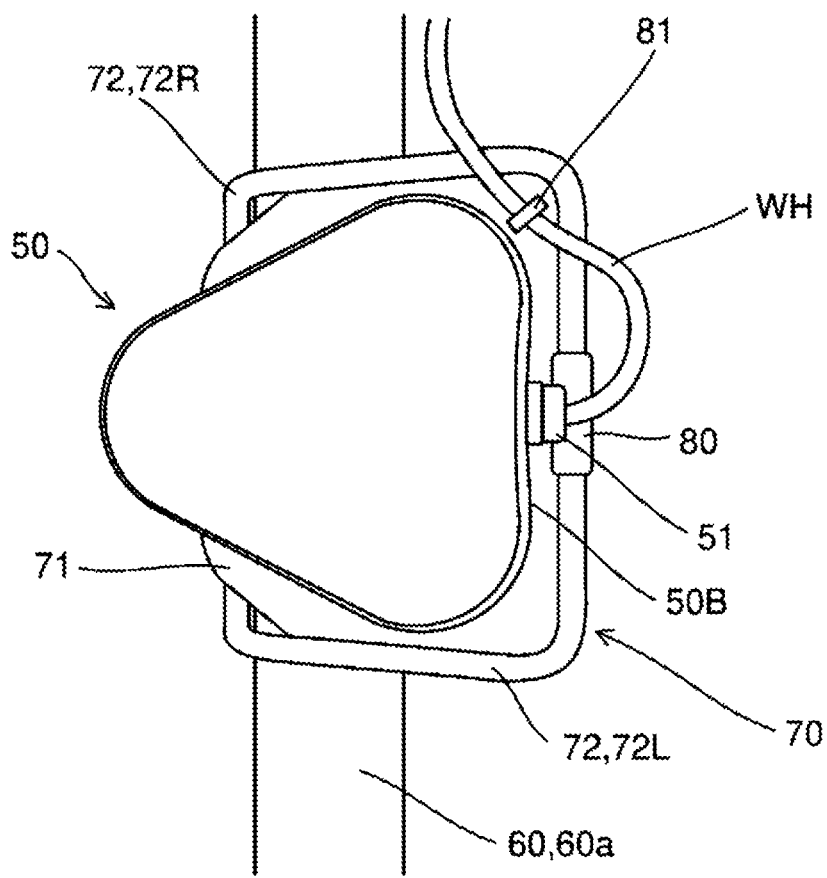
FIG. 4 is a plan view of the support unit.
Figure 5:
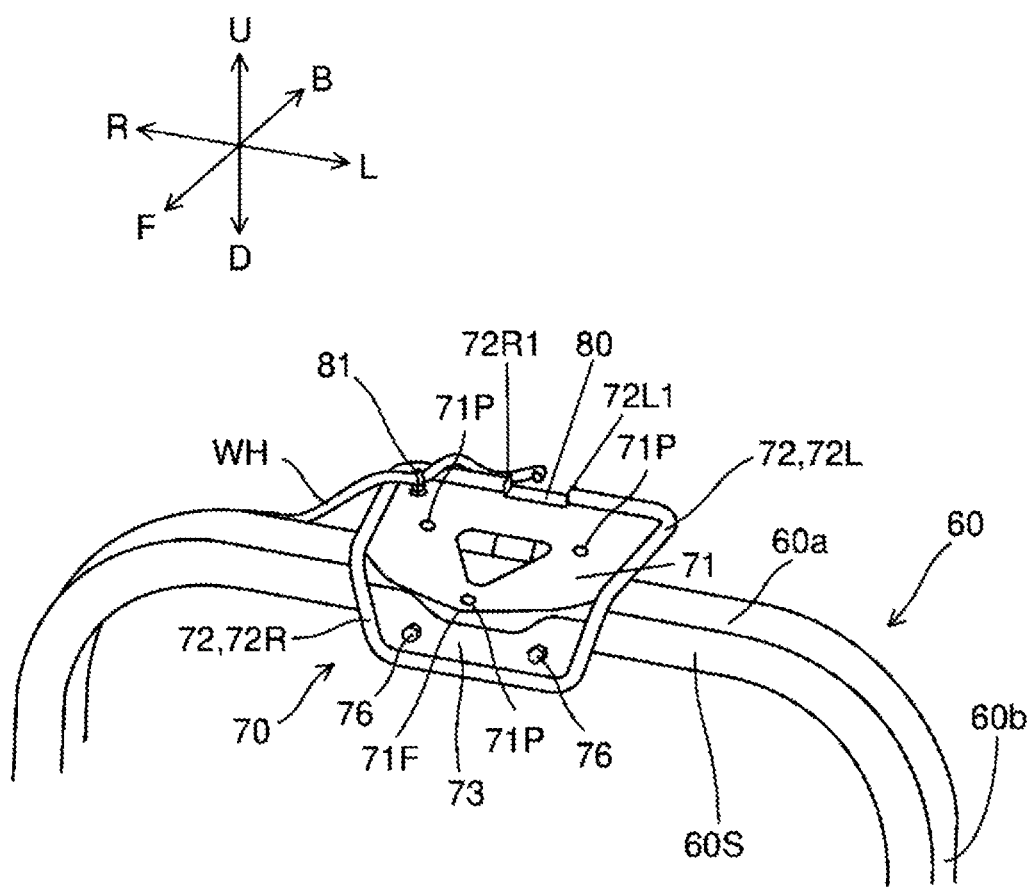
FIG. 5 is a perspective view of the support unit with the antenna unit in FIG. 3 omitted.

FIG. 3 is a perspective view of the antenna unit 50 and the support unit 70 seen from above, with the antenna unit 50 fixed to the ROPS frame 60 via the support unit 70. FIG. 4 is a plan view of the antenna unit 50 and support unit 70. FIG. 5 is a perspective view of the support unit 70, with the antenna unit 50 in FIG. 3 omitted. In the present embodiment, the support unit 70 functions not only as a support member to support the antenna unit 50, but also functions as a protective member to protect a harness connection portion 51 (see FIG. 4) of the antenna unit 50. Herein, the harness connection portion 51 is to be described.

As shown in FIG. 4, the harness connection portion 51 of the antenna unit 50 is a connector (coupler) connected to the harness WH described above. The terminal on one end side of the harness WH is connected to the harness connection portion 51, and the terminal on the other end side is connected to the control unit 23 (see FIG. 2), thereby to make it possible to electrically connect the antenna unit 50 and the control unit 23. Then, various information acquired at the antenna unit 50 (position information, correction information, posture information, etc.) can be sent via the harness WH to the outside (herein, the control unit 23). Thus, the antenna unit 50 has a harness connection portion 51 that is connected to the harness WH for sending information to the outside.

The harness connection portion 51's position in the antenna unit 50 is not limited, but in the present embodiment, the harness connection portion 51 is positioned at the back portion of the antenna unit 50. This is due to the following reason.

For example, in a configuration where the harness connection portion 51 is provided on the bottom face of the antenna unit 50 and the harness WH connected to the harness connection portion 51 is caused to pass through the inside of the ROPS frame 60, it is necessary to provide a hole, which is used for the harness WH to pass through, on the upper face of the ROPS frame 60 (the face in contact with the bottom face of the antenna unit 50). There is a concern that providing the hole in the ROPS frame 60 may reduce the strength of the ROPS frame 60.

In the configuration where the harness connection portion 51 is located at the back portion of the antenna unit 50, as in the present embodiment, the harness WH connected to the harness connection portion 51 can be pulled around outside the ROPS frame 60. Therefore, there is no need to provide the hole in the ROPS frame 60 for the harness WH to pass through. This can prevent the strength of the ROPS frame 60 from being reduced due to drilling of the hole in the ROPS frame 60. In addition, since the harness WH can be pulled around behind the ROPS frame 60, the harness WH does not become an obstacle for the driver operating in the driver seat area 7 in front of the ROPS frame 60.

As shown in FIG. 4, the support unit 70 is located protruding from the harness connection portion 51 of the antenna unit 50. Details of the support unit 70 will be described below, but in the present embodiment, a protective pipe 72, which is a protective member of the support unit 70, has a back end located behind the harness connection portion 51 (see FIG. 4). From this, it can be said that the support unit 70 having the protective pipe 72 is located protruding backward from the harness connection portion 51.

With such a positional relation between the antenna unit 50 and the support unit 70; even when the work instrument 100 (see FIG. 1) connected to the back of the vehicle body 2 is raised, the support unit 70 can prevent the harness connection portion 51 of the antenna unit 50, which is fixed to the ROPS frame 60 via the support unit 70 (in particular, the protective pipe 72 described below), from coming into contact with the work instrument 100. This reduces the risk of the harness connection portion 51 coming into contact with the work instrument 100 and being damaged.

For example, it can be so configured that the upper portion of the ROPS frame 60 can turn backward (bendable) so as to prevent the upper portion of the ROPS frame 60 from contacting the upper portion of the barn doorway when the tractor 1 is to be stored in the barn. Even when the antenna unit 50 is fixed via the support unit 70 to the ROPS frame 60 with the above configuration, the support unit 70 can prevent the harness connection portion 51 of the antenna unit 50 from coming into contact with the work instrument 100 when the upper portion of the ROPS frame 60 turns backward. Therefore, even when it is so configured that the upper portion of the ROPS frame 60 can turn backward, supporting the antenna unit 50 using the support unit 70 of the present embodiment can reduce the risk of the harness connection portion 51 coming into contact with the work instrument 100 and being damaged.

In particular, the harness connection portion 51 is located protruding backward from a back face 50B of the antenna unit 50. The back face 50B refers to ae backward-facing face in the antenna unit 50.

When the harness connection portion 51 is located protruding backward from the back face 50B of the antenna unit 50, the harness connection portion 51 may be damaged by contact with the outside. Therefore, so as to prevent the harness connection portion 51 from contacting the work instrument 100, the configuration of the present embodiment, in which the support unit 70 is located more backwardly than the harness connection portion 51, is very effective.

As shown in FIG. 4, with the antenna unit 50 fixed to the ROPS frame 60 via the support unit 70, the harness connection portion 51 of the antenna unit 50 is located behind the ROPS frame 60. That is, the support unit 70 supports the antenna unit 50 so that the harness connection portion 51 is located behind the ROPS frame 60.

This configuration ensures that the harness WH, which is connected to the harness connection portion 51, can be pulled around behind the ROPS frame 60. Thus, it is possible to reliably distribute the harness WH that becomes the obstacle for the driver operating in the driver seat area 7 in front of the ROPS frame 60.

Figure 6:
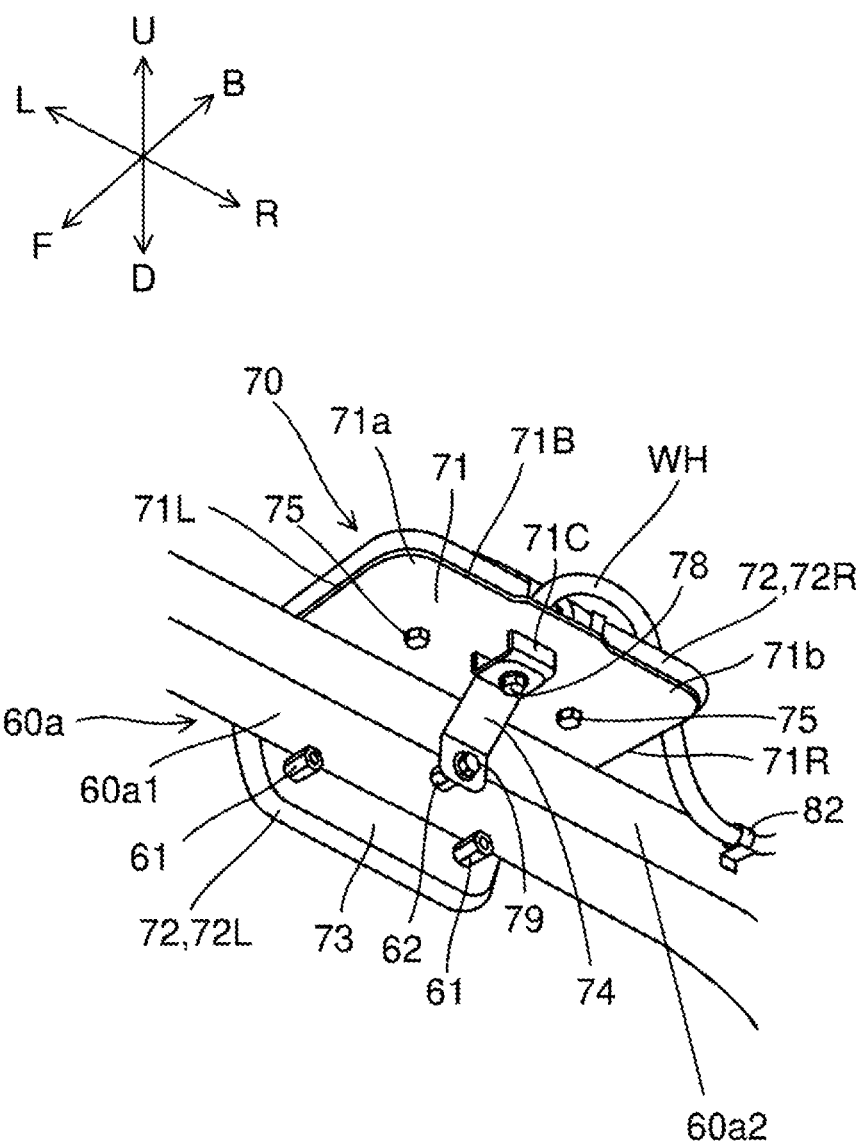
FIG. 6 is a perspective view of the support unit seen from below.
Figure 7:
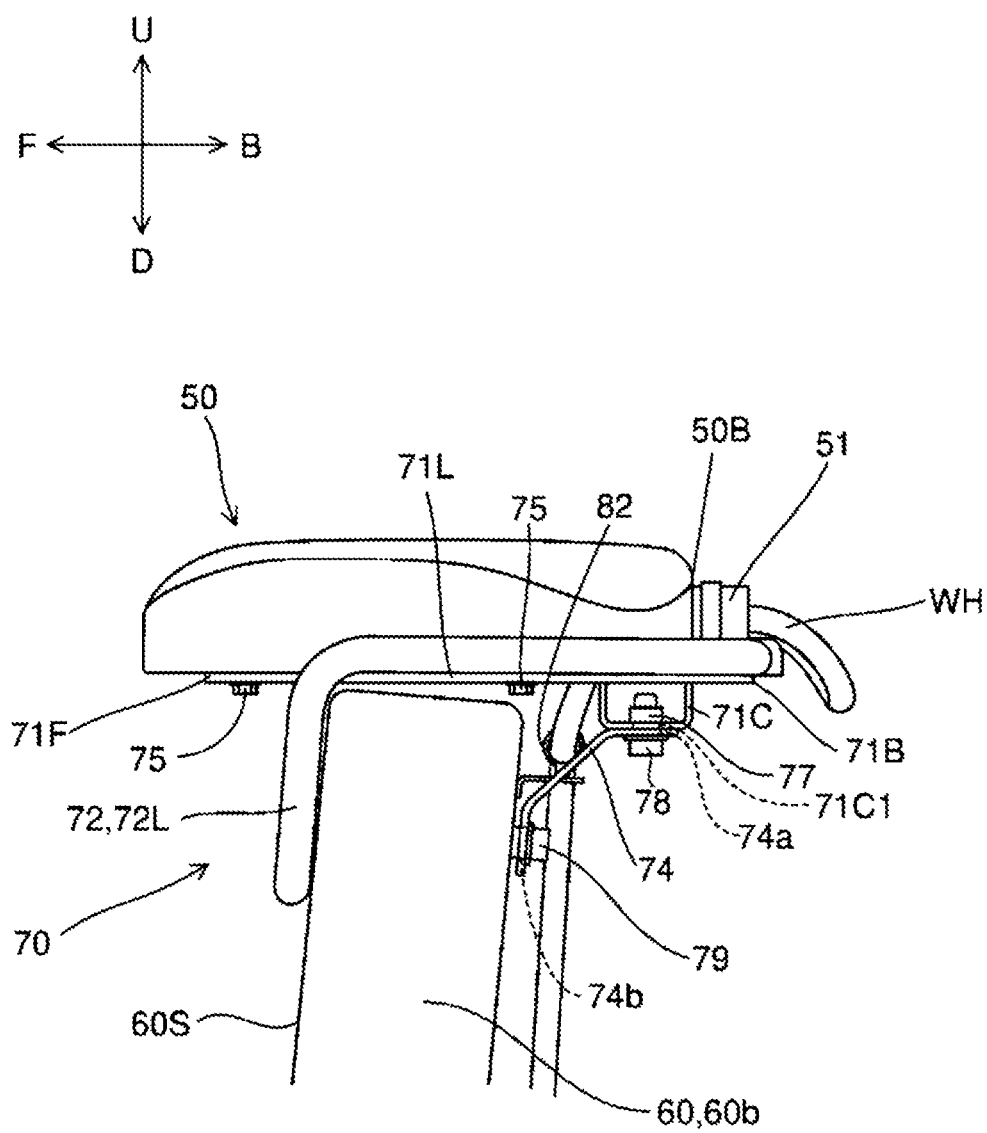
FIG. 7 is a side view of the support unit.

Details of the configuration of the support unit 70 described above will now be described based on FIGS. 6 and 7, with reference to FIGS. 3 through 5. FIG. 6 is a perspective view of the support unit 70 seen from below. FIG. 7 is a side view of the support unit 70. The support unit 70 has a support plate 71, which is a support member, a protective pipe 72, a fixing plate 73, and a fixing stay 74.

The support plate 71 is a base to which the antenna unit 50 is fixed and is located below the antenna unit 50. In the present embodiment, a through hole 71P (see FIG. 5), which passes through in the vertical direction, is provided at an arbitrary location on the support plate 71. In the present embodiment, there are three through holes 71P in the support plate 71, but the number of through holes 71P is not particularly limited. Inserting a first bolt 75 (see FIGS. 6 and 7) into the through hole 71P from the opposite side of the antenna unit 50 and screwing the first bolt 75 with a nut (not shown) provided on the antenna unit 50 side fixes the antenna unit 50 to the support plate 71. That is, the antenna unit 50 is supported from below by the support plate 71. Therefore, the support unit 70 can be said to have the support plate 71 that supports the antenna unit 50 from below. The above screwing means that the bolt is turned to join with the nut.

As shown in FIGS. 5 and 6, the support plate 71 is composed of a flat plate with edges. The above edges include a front edge 71F protruding forward, a left edge 71L located on the left side and approximately along the front-back direction, a back portion edge 71B located at the back portion and approximately along the left-right direction, and a right edge 71R located on the right side and approximately along the front-back direction. As a result, the support plate 71 is pentagonal home plate shaped in plan view. The support plate 71 may be any other polygonal shape, such as a square, or any shape other than a polygon (circle, oval, etc.) in plan view. The support plate 71 is made of metal, such as stainless steel, for example, but may also be made of resin as long as being able to secure strength.

The protective pipe 72 is a hollow metal pipe and is mounted to a portion of the edge of the support plate 71. More particularly, the protective pipe 72 is mounted to the back portion edge 71B, the left edge 71L and right edge 71R of the support plate 71 by welding or any other operation. Like the support plate 71, the protective pipe 72 may also be made of resin. In this case, any method can be selected for fixing the support plate 71 and the protective pipe 72, such as a method using fixing jigs (bolts and nuts). Details of the protective pipe 72 are described below.

The fixing plate 73 is located along a front face 60S of the ROPS frame 60 and is fixed to the protective pipe 72 by welding or any other operation. The front face 60S of the ROPS frame 60 refers to a face positioned on the front side (the face turning forward) in the transverse frame 60a and longitudinal frame 60b of the ROPS frame 60.

The fixing plate 73, in the left-right direction, has two through holes (not shown) that pass through in the front-back direction. In the fixing plate 73, the above through holes are so formed as to correspond to the positions of two front positioning nuts 61 fixed to the ROPS frame 60 (see FIG. 6). The front positioning nut 61 is composed of a nut having a long through-hole in the front-back direction (so-called high nut), and is welded or otherwise connected to a lower face 60a1 of the transverse frame 60a of the ROPS frame 60. On the lower face 60a1 of the transverse frame 60a, the front positioning nut 61 is located at the front side of the center in the front-back direction.

Therefore, inserting the second bolt 76 (see FIGS. 3 and 5) from the front into the above through hole of the fixing plate 73 and screwing the second bolt 76 with the front positioning nut 61 of the ROPS frame 60 can fix the fixing plate 73 to the ROPS frame 60.

The fixing stay 74 is a metal plate used to fix the support plate 71 to the ROPS frame 60. The fixing stay 74 is formed by bending both end portions of a single elongated metal plate in a direction that brings them closer together at an angle of approximately 45°. In FIG. 7, one end portion of the fixing stay 74 has a first through-hole 74a that passes through in the vertical direction, and the other end portion has a second through-hole 74b that passes through in the front-back direction.

A U-shaped metal fitting 71C, which is U-shaped in lateral view, is mounted to the lower face of the support plate 71. A through hole 71C1, which passes through in the vertical direction, is formed in the bottom face of the U-shaped metal fitting 71C.

As shown in FIG. 6, a back positioning nut 62 is welded or otherwise coupled to the lower face 60a1 of the transverse frame 60a of the ROPS frame 60. The back positioning nut 62 is composed of a nut (high nut) having a long through-hole in the front-back direction. On the lower face 60a1 of the transverse frame 60a, the back positioning nut 62 is located backward of the center in the front-back direction and approximately in the center in the left-right direction.

A nut 77 (see FIG. 7) is located within a space enclosed by the lower face of the support plate 71 and the U-shaped metal fitting 71C, and a third bolt 78 is inserted from below into the first through-hole 74a of the fixing stay 74 and the through hole 71C1 of the metal fitting 71C and screwed with the nut 77. In addition, a fourth bolt 79 is inserted from the back into the second through-hole 74b of the fixing stay 74 and screwed with the back positioning nut 62 (see FIG. 6) fixed to the ROPS frame 60. This fixes the support plate 71 to the ROPS frame 60 via the fixing stay 74.

As described above, the second bolt 76 is used thereby to fix the fixing plate 73 to the ROPS frame 60, and the third bolt 78 and the fourth bolt 79 are used thereby to fix the support plate 71 via the fixing stay 74 to the ROPS frame 60, thereby making it possible to firmly fix the support unit 70 to the ROPS frame 60.

Details of the protective pipe 72 are described next. The protective pipe 72 is composed of a left pipe 72L located to the left of the support plate 71's center in the left-right direction and a right pipe 72R located to the right of the center are connected in the left-right direction in front of the ROPS frame 60 and below the support plate 71. A more detailed description is as follows.

With a start point 72L1 (see FIG. 5) defined as a position on the left side of the center of the back portion edge 71B of the support plate 71 in the left-right direction, the left pipe 72L extends to an end portion 71a (see FIG. 6) as a left back end portion of the support plate 71. The left pipe 72L extends from the end portion 71a of the support plate 71 along the left edge 71L to the front of the ROPS frame 60. The left pipe 72L is disconnected from the left edge 71L on the way extending from the end portion 71a of the support plate 71 to the front of the ROPS frame 60. The left pipe 72L bends downward along the front face 60S in front of the ROPS frame 60, extends to a position lower than the transverse frame 60a of the ROPS frame 60, and then is bent rightward and connected with the right pipe 72R.

With the start point 72R1 (see FIG. 5) defined as a position on the right side of the center of the back portion edge 71B of the support plate 71 in the left-right direction, the right pipe 72R extends to an end portion 71b (see FIG. 6) as a right back end portion of the support plate 71. The right pipe 72R extends from the end portion 71b of the support plate 71 along the right edge 71R to the front of the ROPS frame 60. The right pipe 72R is disconnected from the right edge 71R on the way extending from the end portion 71b of the support plate 71 to the front of the ROPS frame 60. The right pipe 72R bends downward along the front face 60S in front of the ROPS frame 60, extends to a position lower than the transverse frame 60a of the ROPS frame 60, and then is bent leftward and connected with the left pipe 72L.

The start point 72L1 of the left pipe 72L and the start point 72R1 of the right pipe 72R are closed by a closing plate 80 (see FIG. 4 and FIG. 5). The closing plate 80 is a U-shaped flat plate viewed from the back, and is fixed to the back portion edge 71B of the support plate 71 by welding or any other operation. The closing plate 80 is located between the start point 72L1 and the start point 72R1. As a result, the start point 72L1 and the start point 72R1 are positioned spaced apart from each other in the left-right direction.

As described above, the support unit 70 has the protective pipe 72 that is mounted to some of the edges of the support plate 71 (back portion edge 71B, left edge 71L, and right edge 71R). The protective pipe 72 is mounted to the back portion of the support plate 71, specifically to the back portion edge 71B, and extends to the left and right.

Mounting the annular protective pipe 72 to some of the edges of the support plate 71 can reinforce the support plate 71 and thus the support unit 70. With this, even when the work instrument 100 (see FIG. 1) rises and collides with the support unit 70, the risk of damage to the support unit 70 can be securely reduced. Thus, the harness connection portion 51 can be reliably protected by the support unit 70.

The protective pipe 72 is so configured as to extend forward from each of the left and right end portions 71a, 71b of the back portion edge 71B of the support plate 71 along each of the left and right edges 71L, 71R of the support plate 71, and to connect in front of the ROPS frame 60 and in the left-right direction at a position lower than the support plate 71.

In front of the ROPS frame 60 and below the support plate 71, the protective pipe 72 is located extending in the left-right direction. With this, even when the driver in the driver seat area 7 in front of the ROPS frame 60 stands up and the driver's head portion contacts the support unit 70, the possibility of the driver's head portion coming into contact with the protective pipe 72 located below the support plate 71 is greater than the possibility of the driver's head portion coming into contact with the support plate 71. The protective pipe 72 is annular and has a rounded outer surface; therefore, even when the driver's head portion contacts the protective pipe 72, the head portion is less likely to be damaged than when the driver's head portion contacting an edge (e.g., front edge 71F (see FIG. 5)) of the support plate 71. That is, the protective pipe 72 reduces the damage to the driver's head portion and protects the driver's head portion.

[3. Fixing of Harness]

As shown in FIGS. 4 and 5, the tractor 1 of the present embodiment is equipped with a first fixing member 81. The first fixing member 81 is a member that fixes, to the support unit 70 (especially, the support plate 71), a portion of the harness WH connected to the harness connection portion 51 of the antenna unit 50. The first fixing member 81 is composed of a wiring clamp (wire saddle), for example, but may also be composed of other fixing fixtures such as bands and clips.

The portion of the harness WH is fixed to the support unit 70 (especially, the support plate 71) by the first fixing member 81, thus stabilizing the pulling around (distributing) of the harness WH.

As shown in FIGS. 6 and 7, the tractor 1 of the present embodiment is further equipped with a second fixing member 82. The second fixing member 82 is a member that fixes a portion of the harness WH to the outer surface of the ROPS frame 60. Conceivable examples of the outer surface of the ROPS frame 60 include a back face 60a2 (see FIG. 6) of the transverse frame 60a of the ROPS frame 60, but the outer surface can also be the upper face of the transverse frame 60a or the outer surface (side face or back face) of the longitudinal frame 60b (see FIG. 1). The second fixing member 82 is composed of a wiring clamp, for example, but may also be composed of other fixing jigs such as bands, clips, etc. The second fixing member 82 may also include a metal fitting that supports the wiring clamp on the outer surface of the ROPS frame 60.

Using the second fixing member 82 can pull around the harness WH along the outer surface of the ROPS frame 60. Therefore, compared to the configuration where the harness WH is so pulled around as to pass through the inside of the ROPS frame 60, for example, pulling around of the harness WH is easier. Also, the outer surface of the ROPS frame 60 has no need to form the hole for the harness WH to pass through, as in the configuration where the harness WH is so pulled around as to pass through the inside of the ROPS frame 60. This avoids reduction in strength of the ROPS frame 60. Further, merely unfixing the second fixing member 82 can easily remove the harness WH from the outer surface of the ROPS frame 60, facilitating maintenance of the harness WH.

[4. Other Methods for Mounting Antenna Unit on ROPS Frame]

Figure 8:
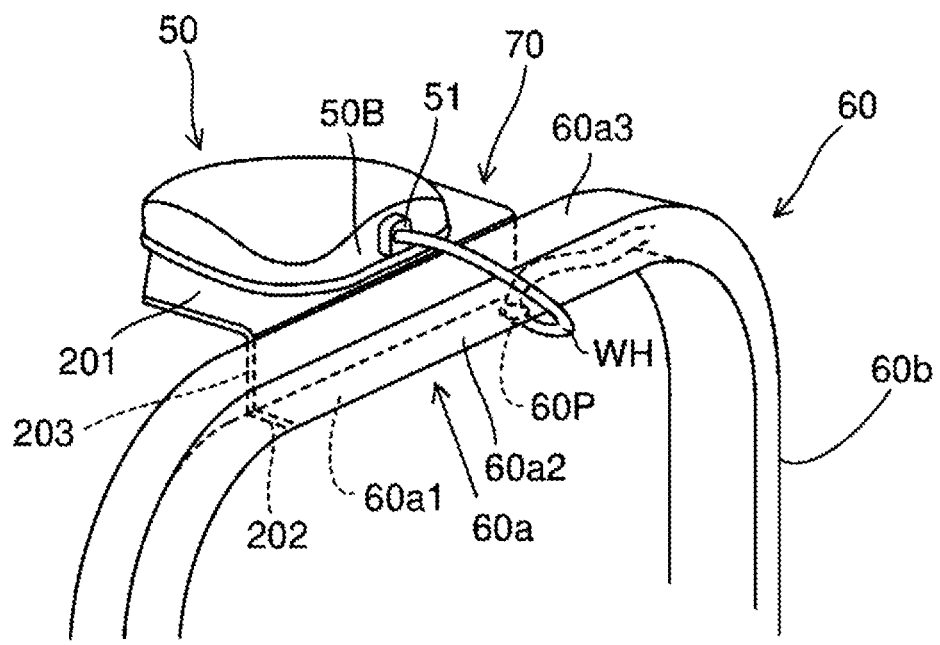
FIG. 8 is a perspective view schematically showing another configuration of the support unit.

FIG. 8 is a perspective view schematically showing another configuration of the support unit 70. The support unit 70 may be fixed to the ROPS frame 60 in a manner to support the antenna unit 50 in front of the ROPS frame 60. The above support unit 70 is so configured as to have a first flat plate portion 201, a second flat plate portion 202, and a coupling portion 203.

The first flat plate portion 201 is a flat plate that extends in the front-back and left-right directions and is located in front of the ROPS frame 60. The antenna unit 50 is fixed to the first flat plate portion 201 from below by bolts or the like. The antenna unit 50 is thus supported from below by the first flat plate portion 201. The above first flat plate portion 201 is located at the same height as an upper face 60a3 of the transverse frame 60a of the ROPS frame 60, but may be higher than the upper face 60a3.

The second flat plate portion 202 is a flat plate that extends in the left-right direction and is located in contact with the lower face 60a1 of the transverse frame 60a of the ROPS frame 60. The second flat plate portion 202 is fixed to the lower face 60a1 of the transverse frame 60a by welding or any other operation, but may also be fixed by bolts or the like. In the vertical direction, the coupling portion 203 connects the back end of the first flat plate portion 201 with the front end of the second flat plate portion 202.

The support unit 70 having the first flat plate portion 201, the second flat plate portion 202, and the coupling portion 203 may be formed by bending a single metal plate. Further, the support unit 70 may be formed in a manner to connect, by welding or otherwise, the first flat plate portion 201 with the coupling portion 203 and the second flat plate portion 202 with the coupling portion 203.

Fixing the antenna unit 50 on the first flat plate portion 201, which is located forward of the ROPS frame 60, allows the antenna unit 50 itself to be located forward of the ROPS frame 60. Therefore, even when the work instrument 100 (see FIG. 1) is raised, the harness connection portion of the antenna unit 50 51 can be prevented from coming into contact with the work instrument 100. As a result, the risk of the harness connection portion 51 coming into contact with the work instrument 100 and being damaged can be reduced.

In addition, when the antenna unit 50 is fixed to the ROPS frame 60, which has the upper portion turnable backward, using the support unit 70 shown in FIG. 8; before the turning of the ROPS frame 60, the antenna unit 50 is located in front of the ROPS frame 60. Therefore, when the upper portion of the ROPS frame 60 is turned backward, the ROPS frame 60 is likely to come into contact with the work instrument 100 before the antenna unit 50, and the antenna unit 50 is less likely to come into contact with the work instrument 100. Therefore, even when the antenna unit 50 is fixed to the ROPS frame 60, which has the upper portion turnable backward, using the support unit 70 shown in FIG. 8, the risk of the harness connection portion 51 of the antenna unit 50 coming into contact with the work instrument 100 and being damaged can be reduced.

As shown in FIG. 8, the lower face 60a1 of the transverse frame 60A of the ROPS frame 60 may have an insertion hole 60P. Then, the harness WH, which is connected to the harness connection portion 51 of the antenna unit 50, may be distributed via the insertion hole 60P through the inside of the ROPS frame 60.

Generally, there is a concern that the strength of the ROPS frame 60 may be reduced when the ROPS frame 60 is configured to be provided with the insertion hole 60P; however, appropriately selecting the material or the like of the ROPS frame 60 can secure the minimum necessary strength of the ROPS frame 60. Therefore, on condition that the strength of the ROPS frame 60 should be secured, providing the ROPS frame 60 with the insertion hole 60P and causing the harness WH to pass through the inside of the ROPS frame 60 via the insertion hole 60P can prevent appearance quality deterioration due to the harness WH's exposure to the outside.

In addition, since the insertion hole 60P is formed on the lower face 60a1 of the ROPS frame 60 (transverse frame 60a), rainwater falling from above, water during vehicle washing, mud, etc. are unlikely to penetrate into the inside of the ROPS frame 60 through the insertion hole 60P. Thus, corrosion of the harness WH due to water and other elements entering the inside of the ROPS frame 60 can be reduced.

Provided that the strength of the ROPS frame 60 should be secured, the insertion hole 60P may be formed on the back face 60a2 of the ROPS frame 60 (e.g., transverse frame 60A).

Figure 9:
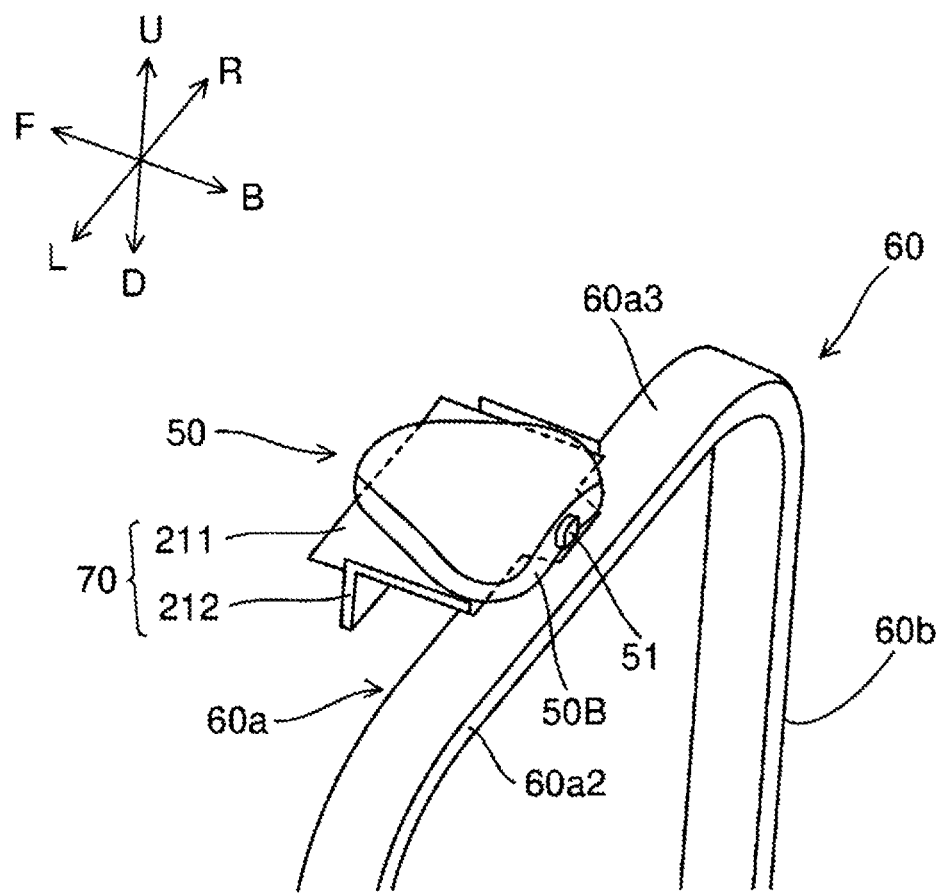
FIG. 9 is a perspective view schematically showing still another configuration of the support unit.
Figure 10:
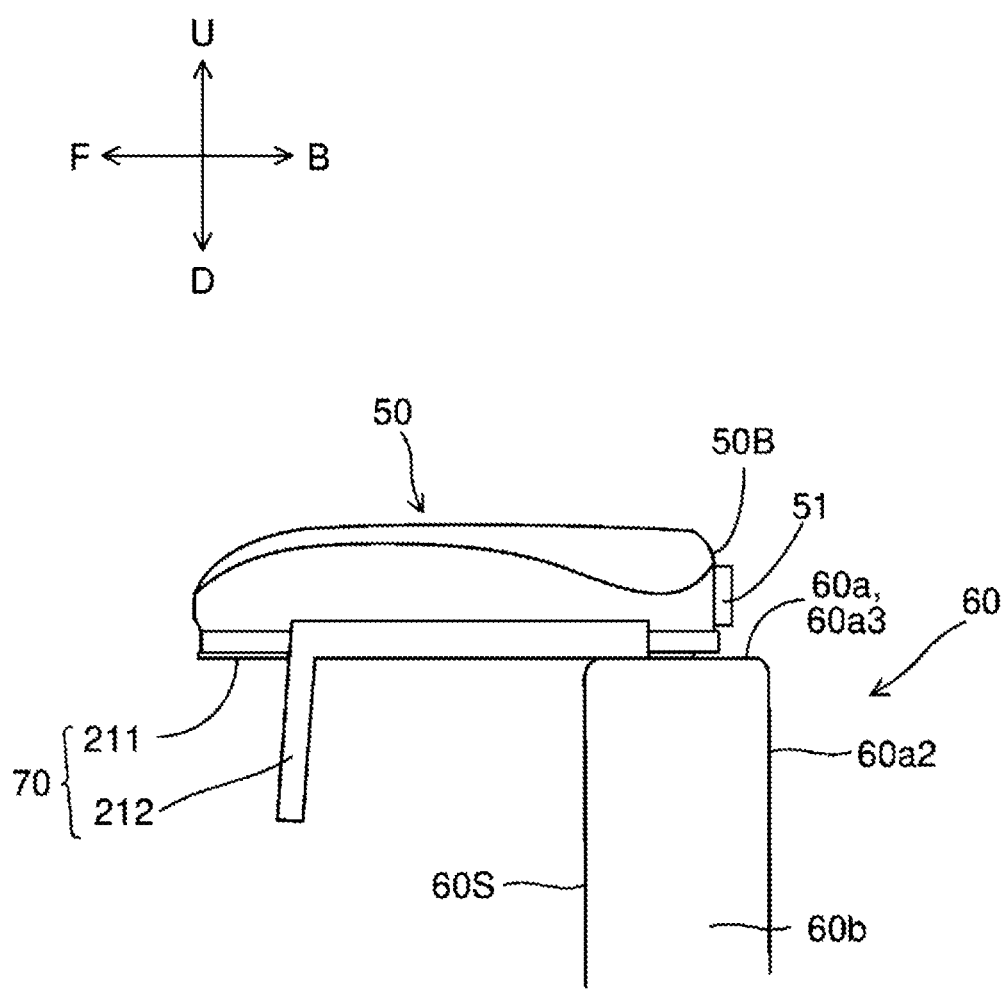
FIG. 10 is a side view of the support unit in FIG. 9.

FIG. 9 is a perspective view showing still another configuration of the support unit 70. FIG. 10 is a side view of the support unit 70 in FIG. 9. The support unit 70 may be configured to support the antenna unit 50 so that the harness connection portion 51 of the antenna unit 50 overlaps the ROPS frame 60 when viewed from above. Here, "the 51 harness connection portions overlaps with the ROPS frame 60 viewed from above" means that all of the harness connection portions 51 overlap the ROPS frame 60 (especially, the transverse frame 60a) when viewed from above. This means that, when viewed from above, the harness connection portion 51 is located between the upper portion of the front face 60S of the ROPS frame 60 and the upper portion of the back face 60a2.

The support unit 70 is so configured as to have a support stand 211 and a fixing stay 212. The antenna unit 50 is fixed to the support stand 211 from below by bolts or the like. The antenna unit 50 is thus supported from below by the support stand 211. The fixing stay 212 is L-shaped in lateral view and is fixed to the support stand 211 by welding or any other operation, thereby to support the support stand 211 from below. Also, the fixing stay 212 is fixed to the upper face 60a3 of the transverse frame 60a of the ROPS frame 60 by welding or any other operation.

With the support unit 70, the harness connection portion 51 of the antenna unit 50 is located in a manner to overlap the ROPS frame 60 viewed from above; therefore, even when the work instrument 100 (see FIG. 1) is raised, the above prevents the harness connection portion 51 of the antenna unit 50 from coming into contact with the work instrument 100. As a result, the risk of the harness connection portion 51 coming into contact with the work instrument 100 and being damaged can be reduced.

Even when the support unit 70 in FIG. 9 is applied to the ROPS frame 60 whose upper portion is turnable backward, turning the upper portion of ROPS frame 60 backward causes the ROPS frame 60 to come into contact with the work instrument 100 earlier than the harness connection portion 51 of the antenna unit 50. Therefore, even when the upper portion of the ROPS frame 60 is turned backward, the risk of the harness connection portion 51 coming into contact with the work instrument 100 and being damaged can be reduced.

Figure 11:
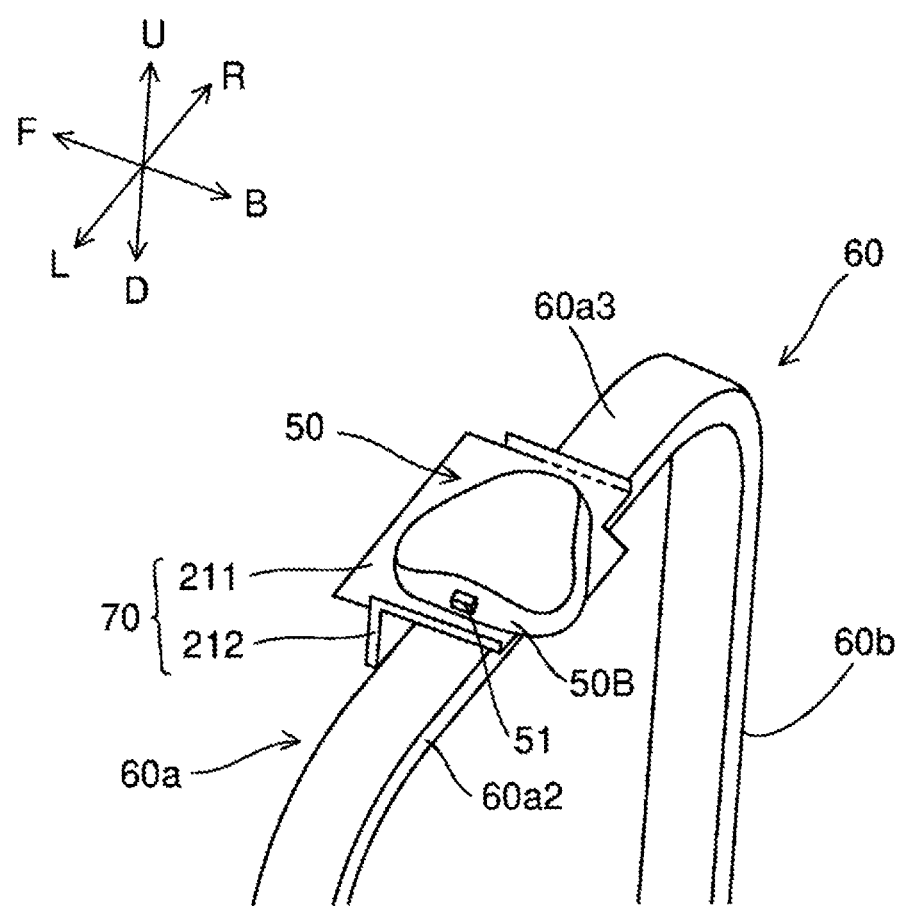
FIG. 11 is a perspective view schematically showing still another configuration of the support unit.
Figure 12:
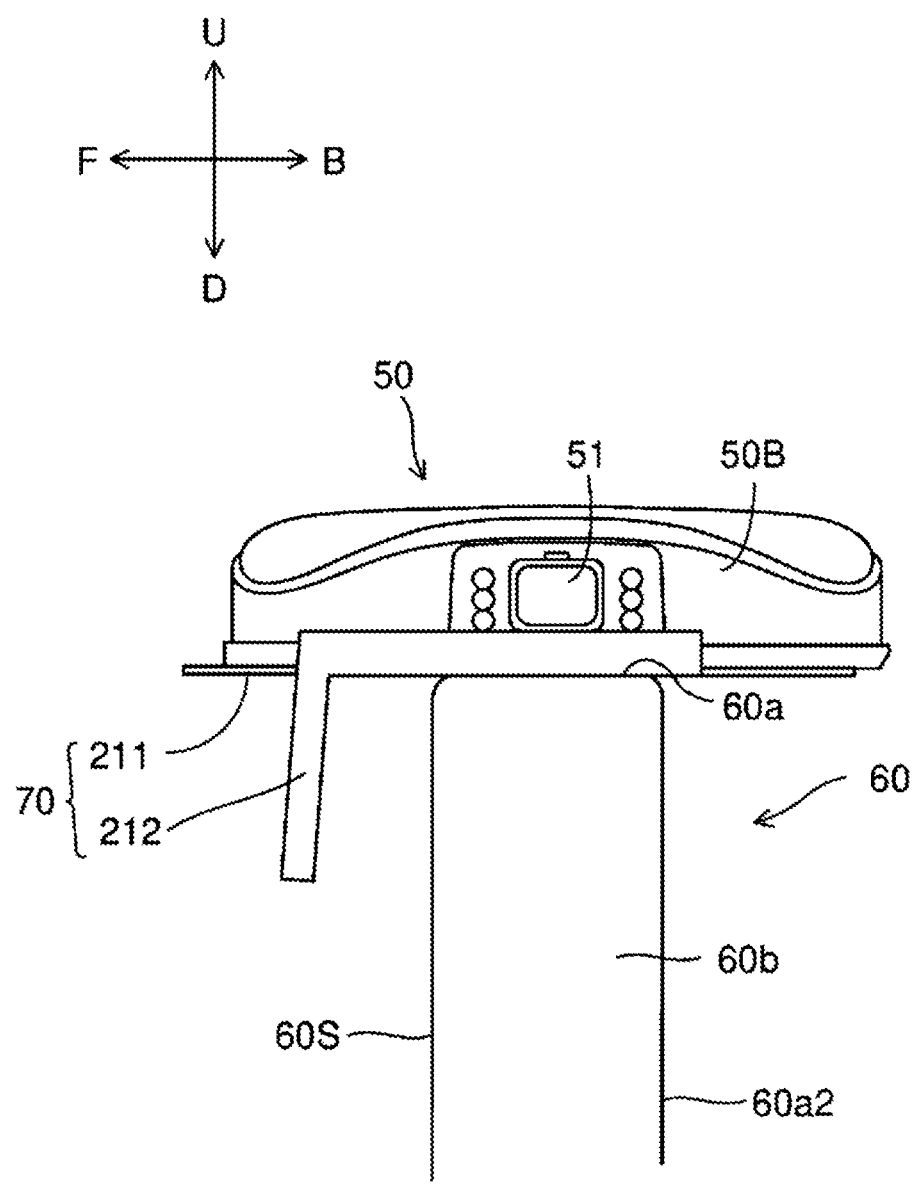
FIG. 12 is a side view of the support unit in FIG. 11.

FIG. 11 is a perspective view schematically showing still another configuration of the support unit 70. FIG. 12 is a side view of the support unit 70 in FIG. 11. The support unit 70 is common to FIG. 9 in supporting the antenna unit 50 so that the harness connection portion 51 of the antenna unit 50 overlaps the ROPS frame 60, viewed from above. The difference from FIG. 9 is that the support unit 70 supports the antenna unit 50 by 90° turning the antenna unit 50 to the right from the position in FIG. 9 by. So as to realize the configuration where the support unit 70 supports the antenna unit 50 so that the harness connection portion 51 overlaps the ROPS frame 60; as shown in FIGS. 11 and 12, the position of fixing the fixing stay 212 to the ROPS frame 60 by welding or the like is shifted backward from the position shown in FIGS. 9 and 10.

The support unit 70 may support the antenna unit 50 by 90° turning the antenna unit 50 to the left from the position in FIG. 9. If the harness connection portion 51 overlaps the ROPS frame 60 when viewed from above, the turning angle of the antenna unit 50 from the position in FIG. 9 is not limited to 90° described above, but may be any other angle.

Even when the support unit 70 is so configured as to support the antenna unit 50, as shown in FIG. 11, the same effect as in FIG. 9 can be acquired. That is, the harness connection portion 51 is so located as to overlap the ROPS frame 60 when viewed from above; therefore, even when the work instrument 100 (see FIG. 1) is raised, the harness connection portion 51 of the antenna unit 50 is prevented from coming into contact with the work instrument 100, making it possible to reduce the risk of damage to the harness connection portion 51. Even when the support unit 70 of FIG. 11 is applied to the ROPS frame 60 whose upper portion is turnable backward, the risk of the harness connection portion 51 coming into contact with the work instrument 100 and being damaged can be reduced when the upper portion of the ROPS frame 60 turns backward.

Figure 13:
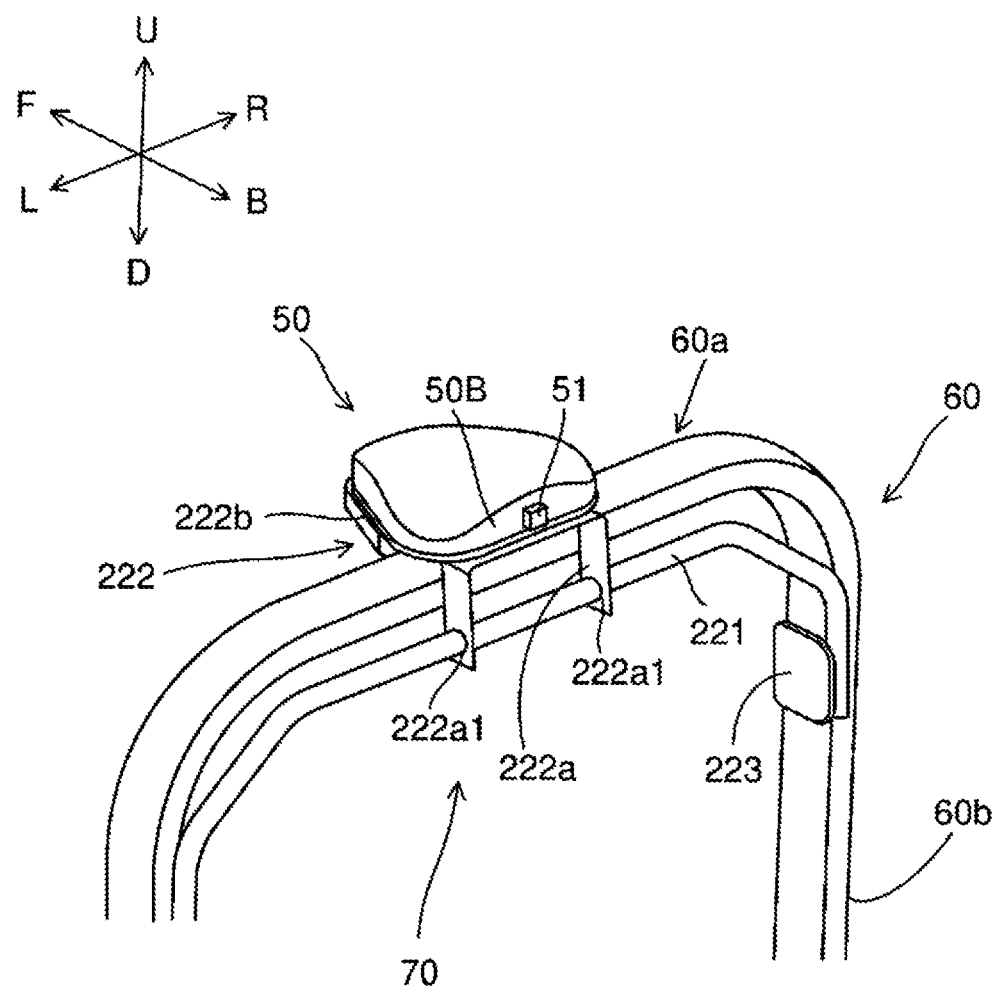
FIG. 13 is a perspective view schematically showing still another configuration of the support unit.

FIG. 13 is a perspective view schematically showing still another configuration of the support unit 70. The support unit 70 may be configured to turn the antenna unit 50. The support unit 70 is so configured as to have a support pipe 221 and a turn plate 222.

The support pipe 221 is so configured as to extend below the transverse frame 60a of the ROPS frame 60 in the left-right direction and to bend downward near the longitudinal frame 60b. Both ends of the support pipe 221 are fixed to the longitudinal frame 60b by a fixing member 223.

The turn plate 222 is so configured as to have a metal plate 222a that is inverted U-shaped viewed from the back, and a support plate 222b connected to the upper portion of the metal plate 222a and extending forward. The metal plate 222a is located behind the transverse frame 60a of the ROPS frame 60. In the left and right directions, the metal plate 222a has two insertion holes 222a1 through which the support pipe 221 is inserted. The antenna unit 50 is fixed to the support plate 222b by bolts or the like. As a result, the antenna unit 50 is supported from below by the support plate 222b.

The support pipe 221 is inserted through the insertion hole 222a1 of the metal plate 222a of the turn plate 222, so the turn plate 222 is turnable with the support pipe 221, which extends in the left-right direction, as the rotational axis. The support pipe 221 itself does not rotate.

Figure 14:
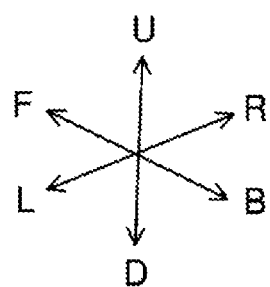
FIG. 14 is a perspective view of the support unit in FIG. 13, showing a state seen after turning a turn plate.
Figure 14:
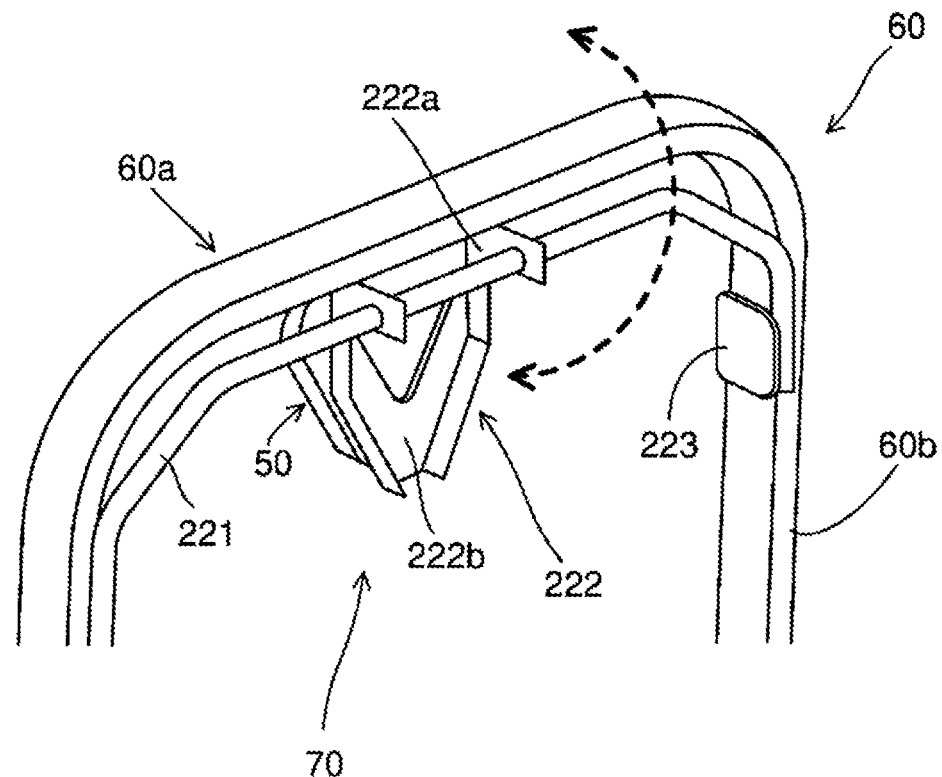

FIG. 14 shows a state seen after turning the turn plate 222. In the state in FIG. 13, since the metal plate 222a of the turn plate 222 is located behind the transverse frame 60a, the turn plate 222 turns so that the antenna unit 50 supported by the support plate 222b passes behind the ROPS frame 60. In this configuration, after the turning of the turn plate 222, the antenna unit 50 supported by the support plate 222b can be located in front of the ROPS frame 60. Therefore, even when the work instrument 100 (see FIG. 1) is raised, the harness connection portion 51 of the antenna unit 50 is prevented from coming into contact with the work instrument 100, thereby reducing the risk of damage to the harness connection portion 51.

The turning of the turn plate 222 moves the antenna unit 50 to a lower position (the overall height of the tractor 1 is lowered). At the time of storing the tractor 1 in a barn, this allows the tractor 1 to be stored in a barn without the antenna unit 50 contacting the upper portion of the barn entrance. Further, the turn plate 222 turns such that the antenna unit 50 passes behind the ROPS frame 60, thus preventing as much as possible the antenna unit 50 from interfering (having a contact) with the driver in the driver seat area 7 in front of the ROPS frame 60.

The metal plate 222a of the turn plate 222 may be located in front of the transverse frame 60a. Then, the turn plate 222 is so configured as to rotate such that the antenna unit 50 passes in front of the ROPS frame 60. Even with this configuration; after the turning of the turn plate 222, the antenna unit 50, which is supported by the support plate 222b, can be located in front of the ROPS frame 60. Therefore, even when the work instrument 100 is raised, the harness connection portion 51 of the antenna unit 50 is prevented from contacting the work instrument 100, making it possible to reduce the risk of damage to the harness connection portion 51.

Figure 15:
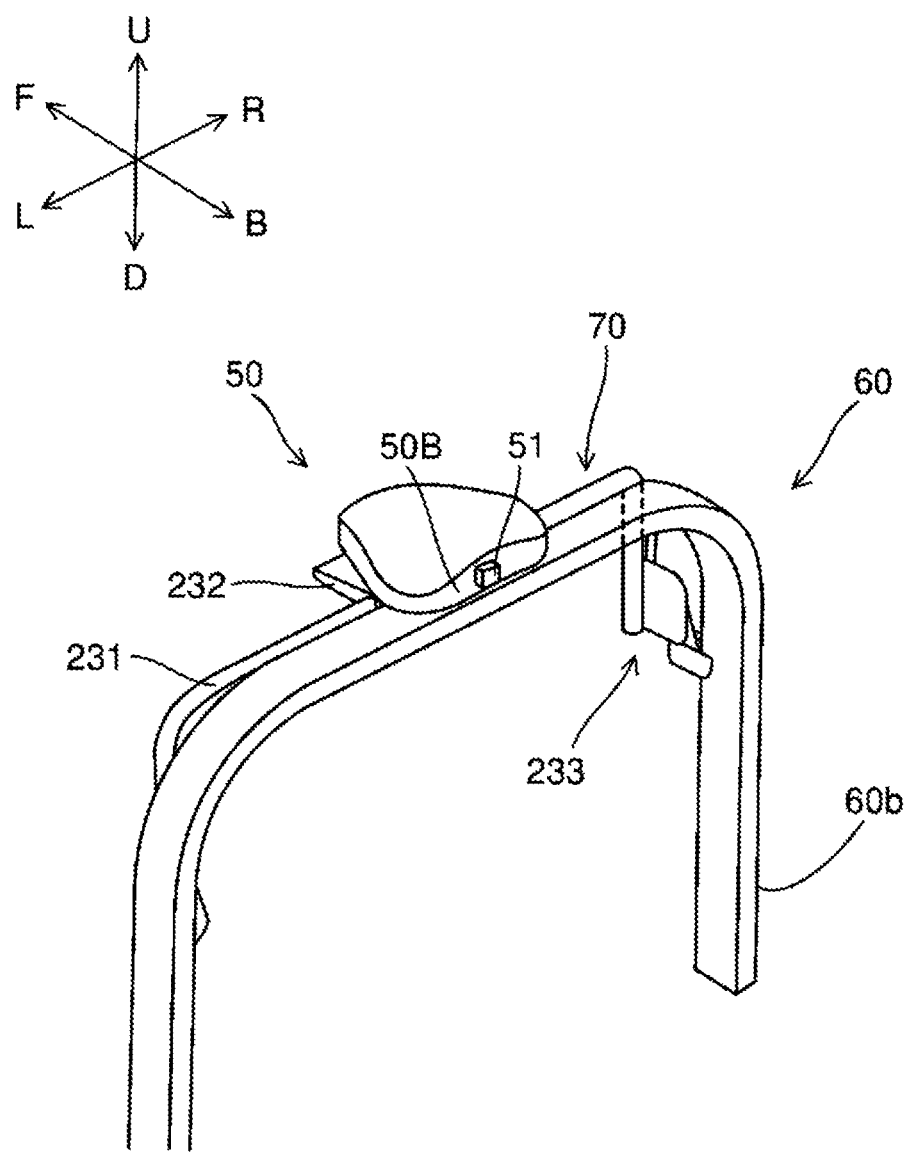
FIG. 15 is a perspective view schematically showing still another configuration of the support unit.

FIG. 15 is a perspective view schematically showing still another configuration of the support unit 70. As shown in FIG. 15, the support unit 70 may be configured to rotate the antenna unit 50 in combination with the support pipe 231 as a whole. The support unit 70 is so configured as to have the support pipe 231, a turn plate 232, and a hinge portion 233.

The support pipe 231 is so configured as to extend in front of the transverse frame 60a of the ROPS frame 60 in the left-right direction, and to be bent downward near the longitudinal frame 60b. Both ends of the support pipe 231 are fixed to the longitudinal frame 60b via the hinge portion 233.

The turn plate 232 is fixed to the support pipe 231 by welding or any other operation. The antenna unit 50 is fixed to the turn plate 232 by bolts or the like. The antenna unit 50 is thus supported from below by the turn plate 232.

The hinge portion 233 is a turn mechanism by which the support pipe 231 is rotatably connected to the ROPS frame 60 (particularly longitudinal frame 60b). The hinge portion 233 allows the support pipe 231 to rotate relative to the ROPS frame 60, with the left and right directions as the rotational axis.

Figure 16:
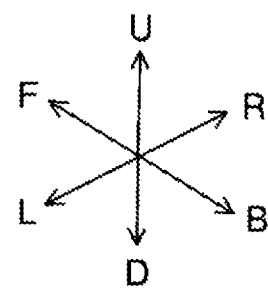
FIG. 16 is a perspective view of the support unit in FIG. 15, showing a state seen after turning the turn plate and a support pipe.
Figure 16:
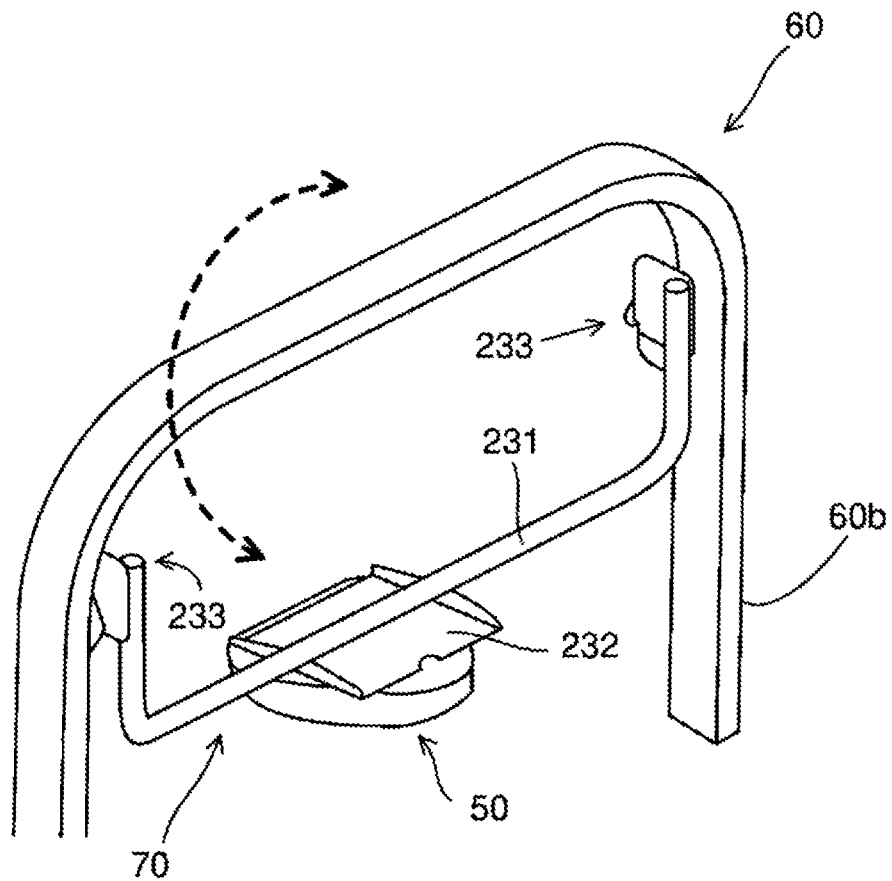

FIG. 16 shows a state seen after the support pipe 231 is rotated together with the turn plate 232. In the state shown in FIG. 15; since the support pipe 231 is located in front of the transverse frame 60a of the ROPS frame 60, the turn plate 232 is rotated together with the support pipe 231 so that the antenna unit 50 supported by the turn plate 232 passes in front of the ROPS frame 60. In this configuration, after the turning of the turn plate 232, the harness connection portion 51 (see FIG. 15) of the antenna unit 50 supported by the turn plate 232 can be located in front of the ROPS frame 60. Thus, even when the work instrument 100 (see FIG. 1) is raised, the harness connection portion 51 is prevented from coming into contact with the work instrument 100, making it possible to reduce the risk of damage to the harness connection portion 51.

The antenna unit 50 moves to a lower position due to the turning of the turn plate 232; therefore, at the time of storing the tractor 1 in the barn, the tractor 1 can be stored in the barn without the antenna unit 50 coming in contact with the upper portion of the barn entrance. Further, the hinge portion 233 allows the support pipe 231 to turn together with the turn plate 232 and to move to the lower position, so that, after the turning, the backward view from the driver in the driver seat area 7 can be widely secured (the backward view is not obstructed by the support pipe 231). This makes it easier for the driver to visually check the back.

The support pipe 231 may be located backward of the transverse frame 60a. Then, it may be so configured that the turn plate 232 turns together with the support pipe 231 such that the antenna unit 50 passes behind the ROPS frame 60. Even with this configuration, after the turning of the turn plate 232, the harness connection portion 51 of the antenna unit 50 supported by the turn plate 232 can be located in front of the ROPS frame 60. Therefore, even when the work instrument 100 is raised, the harness connection portion 51 is prevented from contacting the work instrument 100, making it possible to reduce the risk of damage to the harness connection portion 51.

The embodiment of the present invention has been described above, but the scope of the present invention is not limited thereto and can be carried out within an extended or modified range without departing from the gist of the present invention.

INDUSTRIAL APPLICABILITY

The present invention can be used for a work vehicle such as tractor, for example.

REFERENCE SIGNS LIST 1 tractor (work vehicle)
2 vehicle body
7 driver seat area
45 positioning satellite
50 antenna unit (positioning unit)
50B back face
51 harness connection portion
60 ROPS frame
70 support unit
71 support plate (support member)
71a end portion
71b end portion
71B back portion edge (back portion)
71L left edge
71R right edge
72 protective pipe (protective material)
81 first fixing member
82 second fixing member
100 work instrument
WH harness

The invention claimed is:

1. A work vehicle comprising:
a vehicle body to which a work instrument is connected at a back;
a roll-over protection structure (ROPS) frame erected at a back portion of a driver seat area in the vehicle body;
a positioning unit configured to detect a position of the vehicle body based on a signal sent from a positioning satellite, the positioning unit has a harness connection portion that is connected to a harness for sending information to outside, and the harness connection portion is located at a back portion of the positioning unit; and
a support unit that is fixed to an upper portion of the ROPS frame and supports the positioning unit from below, and the support unit is located protruding backwardly from the harness connection portion of the positioning unit.

2. The work vehicle as claimed in claim 1, wherein the harness connection portion is located protruding backwardly from a back face of the positioning unit.

3. The work vehicle as claimed in claim 1, wherein the harness connection portion is located backward of the ROPS frame.

4. The work vehicle as claimed in claim 1, wherein:
the support unit has:
a support member that supports the positioning unit, and
a protective member mounted to the support member, and
the protective member, being mounted to a back portion of the support member,
extends in left and right directions.

5. The work vehicle as claimed in claim 4, wherein the protective member has a shape that extends forward from each of left and right ends of the back portion of the support member along each of left and right edges of the support member, and connects in the left and right directions in front of the ROPS frame and in a position lower than the support member.

6. The work vehicle as claimed in claim 1, further comprising:
a first fixing member configured to fix, to the support unit, a portion of the harness connected to the harness connection portion.

7. The work vehicle as claimed in claim 6, further comprising:
a second fixing member configured to fix the portion of the harness to an outer surface of the ROPS frame.

* * * * *